Feb. 24, 1931.  W. G. LATIMER  1,794,116
KNOCKDOWN BARREL AND METHOD AND MACHINE FOR FORMING SAME
Filed May 17, 1926  7 Sheets-Sheet 1
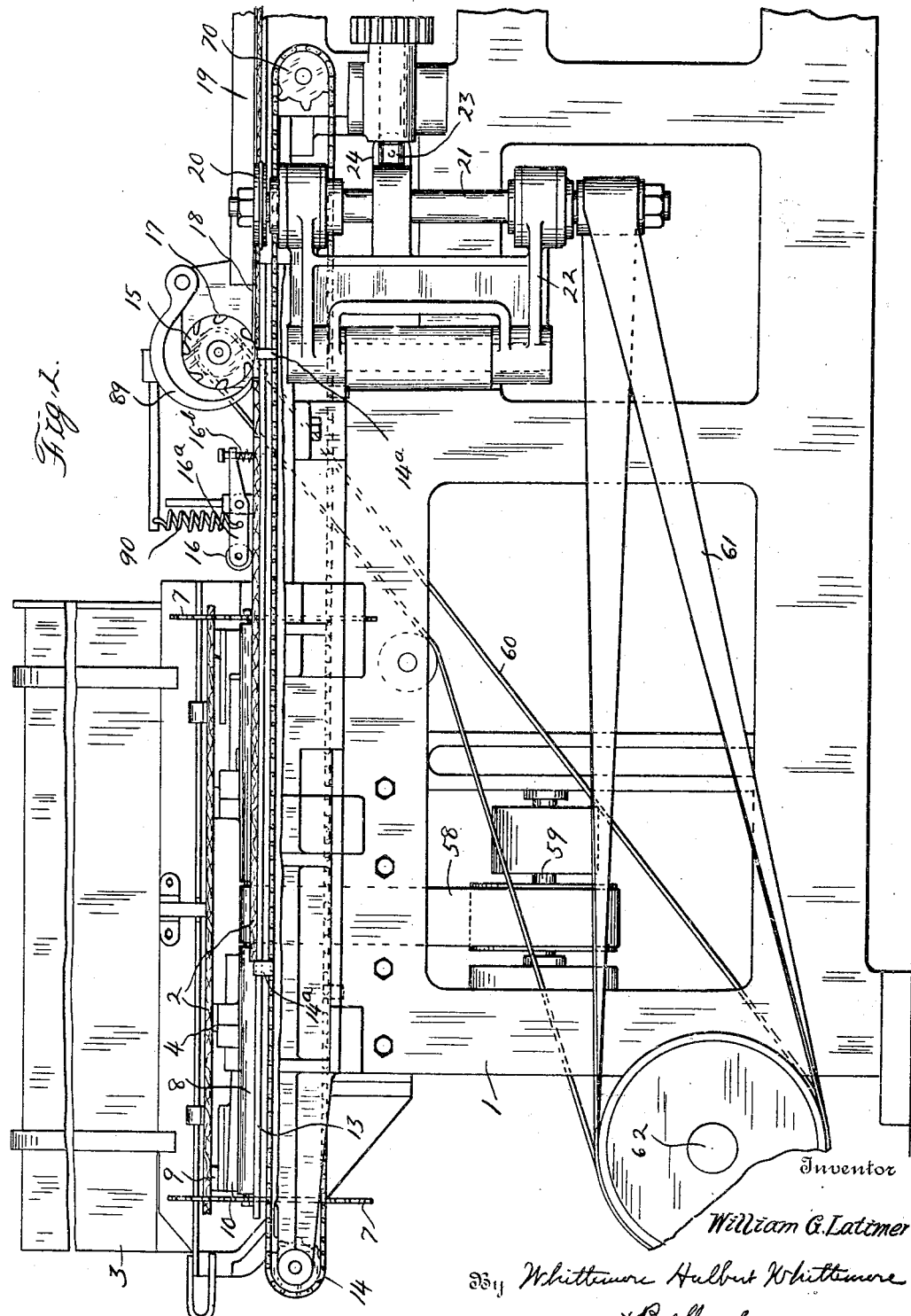
Inventor
William G. Latimer
By Whittemore Hulbert Whittemore
+ Belknap
Attorneys

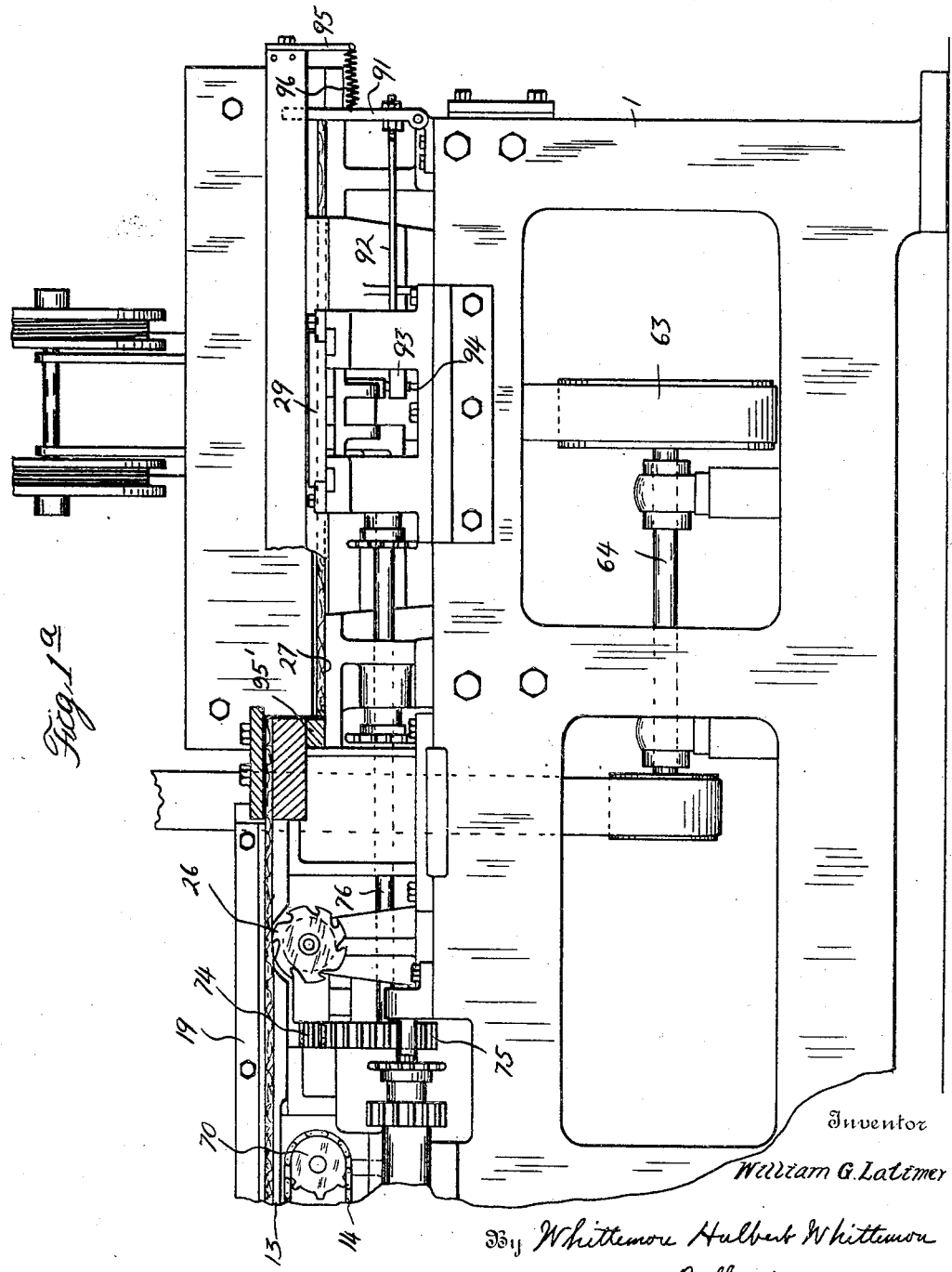

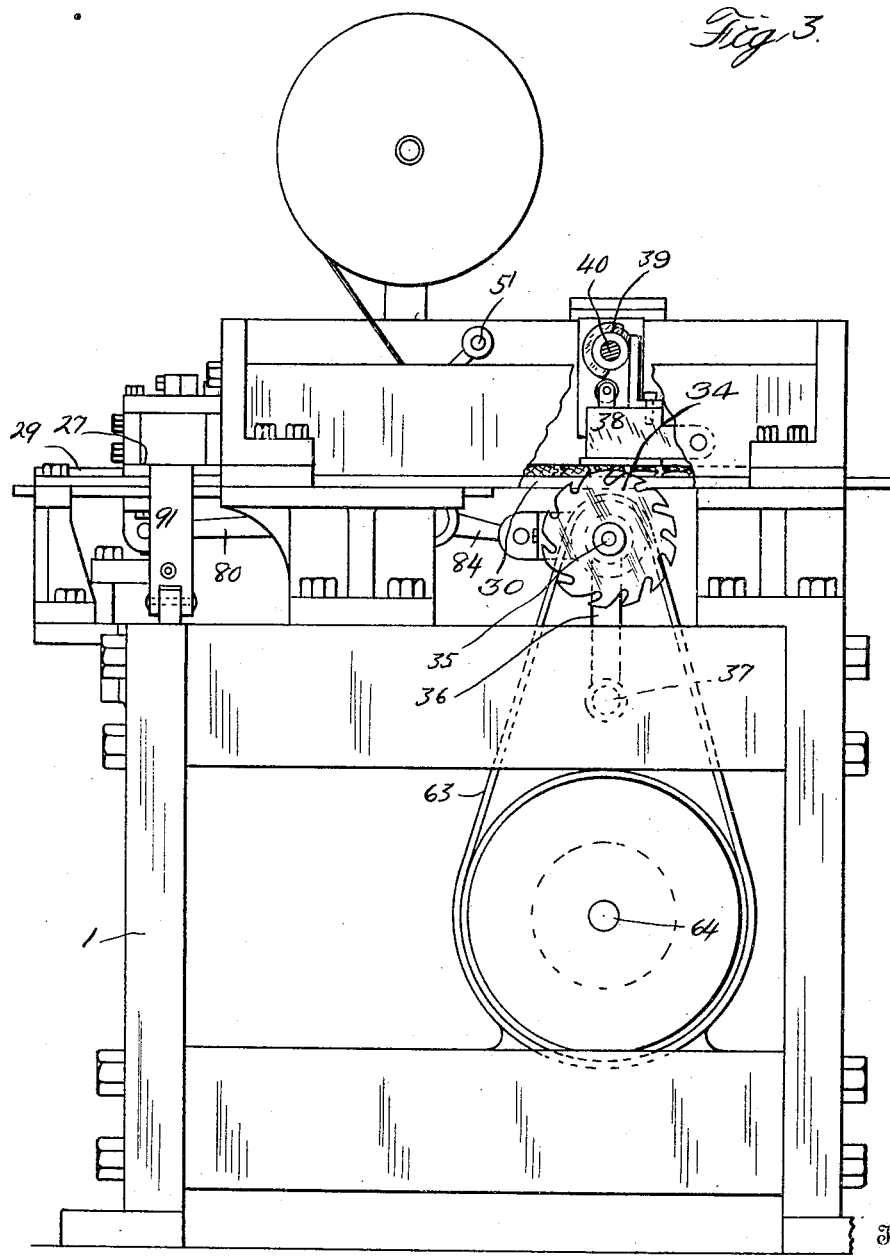

Feb. 24, 1931.                W. G. LATIMER                 1,794,116
           KNOCKDOWN BARREL AND METHOD AND MACHINE FOR FORMING SAME
                          Filed May 17, 1926            7 Sheets-Sheet 5
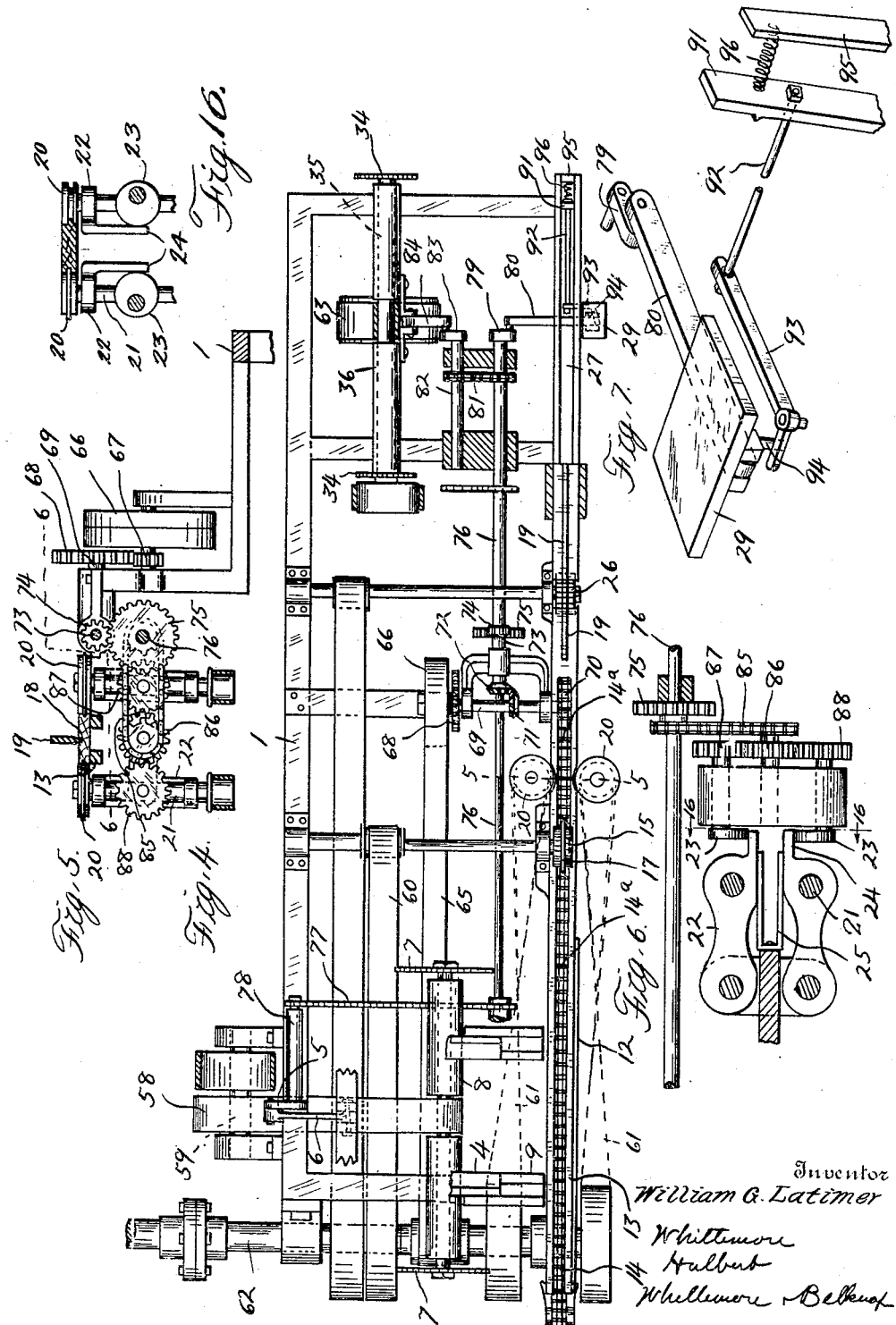

Feb. 24, 1931.  W. G. LATIMER  1,794,116
KNOCKDOWN BARREL AND METHOD AND MACHINE FOR FORMING SAME
Filed May 17, 1926  7 Sheets-Sheet 6
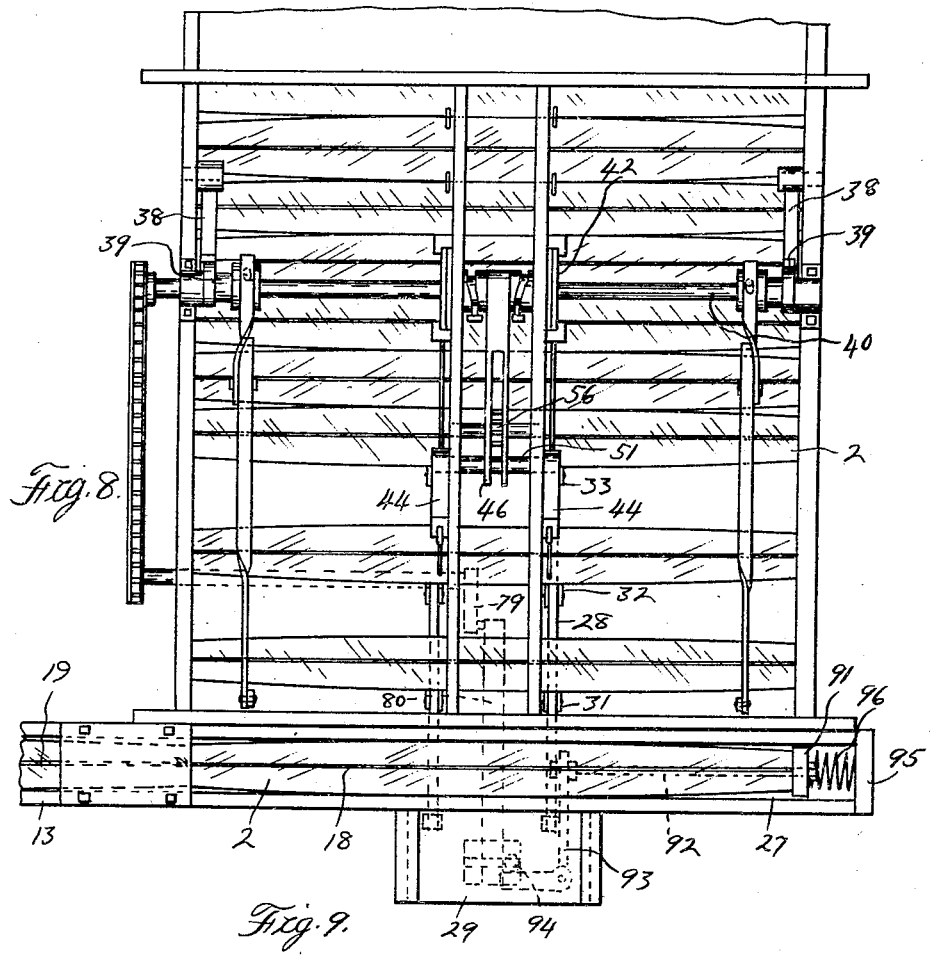
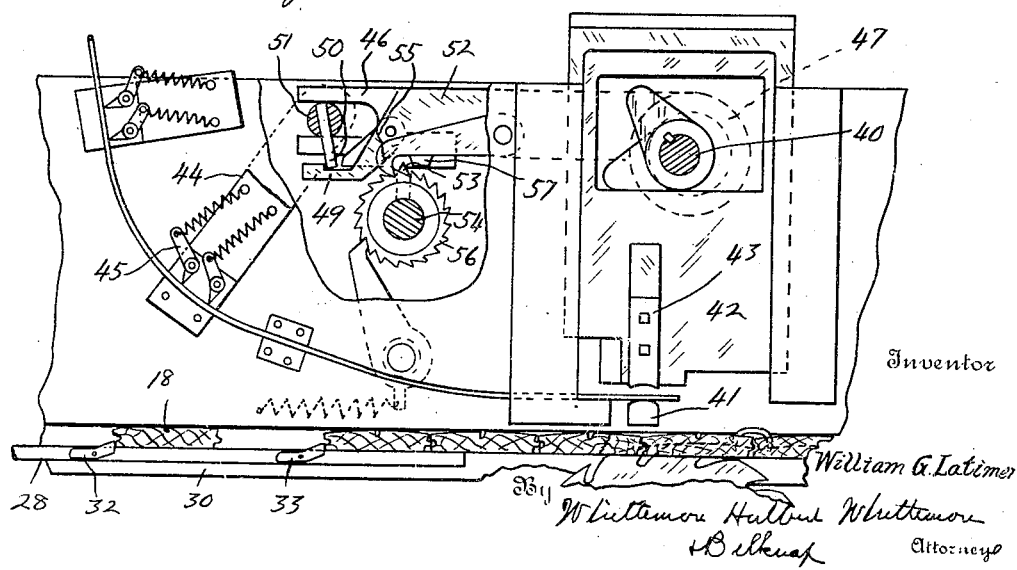
Inventor
William G. Latimer

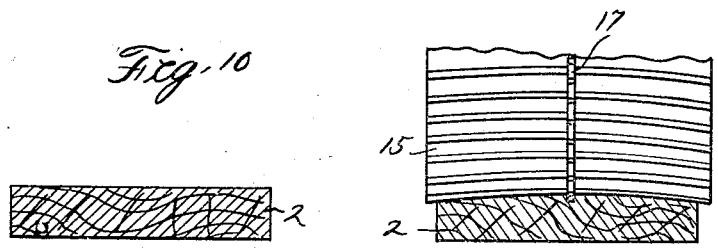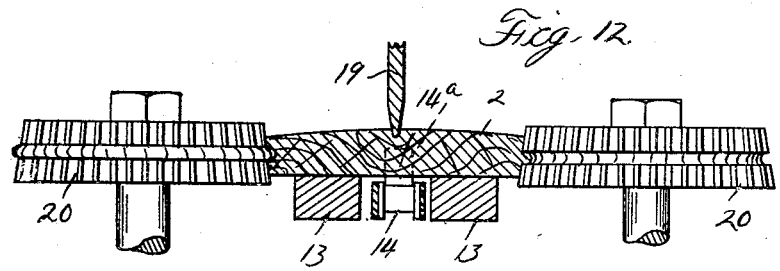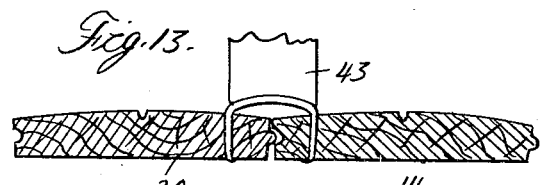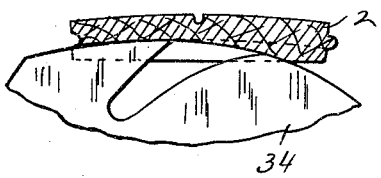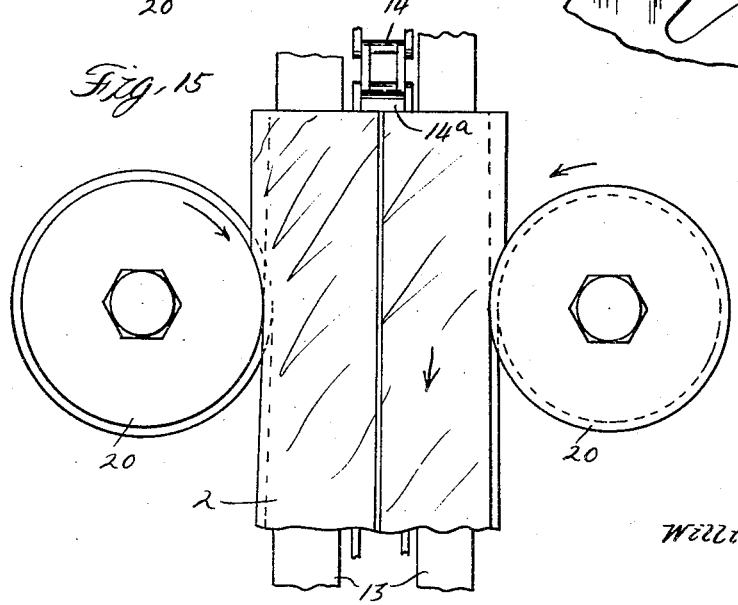

Patented Feb. 24, 1931

1,794,116

UNITED STATES PATENT OFFICE

WILLIAM G. LATIMER, OF DETROIT, MICHIGAN, ASSIGNOR TO FEDERAL COOPERAGE CORPORATION, OF DETROIT, MICHIGAN, A CORPORATION OF MICHIGAN

KNOCKDOWN BARREL AND METHOD AND MACHINE FOR FORMING SAME

Application filed May 17, 1926. Serial No. 109,727.

The invention relates to the manufacture of barrels and has for its principal object the obtaining of a knock down construction which is capable of being compactly stored and shipped and which may be easily and quickly set up at the point of use by comparatively unskilled labor.

Among the further objects of the invention are first, the obtaining of a construction having standardized staves which do not vary in shape or dimensions and are therefore interchangeable with each other; second, the forming of such staves from low grade stock with a relatively small percentage of loss; third, the successive fashioning of the staves and uniting the same into knock-down sections by continuous operation in an automatic machine. With these objects in view the invention consists in the novel construction of the knock-down barrel and the method and machine for forming the same as hereinafter set forth.

In the present state of the art of forming barrel staves a considerable percentage of waste is due to either irregular formation of the staves or the splitting of the same during such formation. A stave for a bilge barrel is of double tapering form having no straight edge for guiding the stock while operated upon by the cutters and consequently it is difficult to hold the work to an exact form. Frequently there will be displacement during the operation which will result in a distorted form and where the grain is not straight there is danger of splitting off portions of the stave so as to render it useless.

With my improved machine the stock is rigidly held to a rectilinear course during the forming operation and consequently all of the staves are standard in construction and are interchangeable. The assembly of a barrel from separate staves requires the skilled operation of a cooper. With my improved construction the staves are so united with each other as to form sections which may be laid flat but which may be easily fashioned into a tight barrel with all of the staves securely held from displacement. While my improved barrel might be formed in various ways, I preferably employ for its production an automatic machine which successively performs the operations of fashioning the staves and assembling the same into knock-down sections.

In the drawings;

Figure 1 is a side elevation of one-half of the machine.

Figure 1ª is a similar view of the complementary portion of the machine.

Figure 3 is an elevation of the opposite end of the machine partly in section to show the manner of forming the croze.

Figure 4 is a plan view partly in horizontal section showing the frame and a part of the mechanism mounted thereon.

Figure 5 is a cross section on line 5—5 of Figure 4.

Figure 6 is a horizontal section on line 6—6 of Figure 5.

Figure 7 is a perspective view showing the means for aligning the staves prior to the assembling of the same into sections.

Figure 8 is a plan view of the stave assembling mechanism.

Figure 9 is an elevation of the wire feed and stapling mechanism.

Figure 10 is a cross section of the stave blank.

Figure 11 shows the fashioning of the outer surface of the stave blank and the formation of the guide groove therein.

Figure 12 illustrates the edge fashioning of the stave.

Figure 13 shows the stapling of the staves to each other.

Figure 14 is a cross section showing the croze groove forming operation.

Figure 15 is a plan view of Figure 12.

Figure 16 is taken on the line 16—16 of Figure 6.

Figure 2:
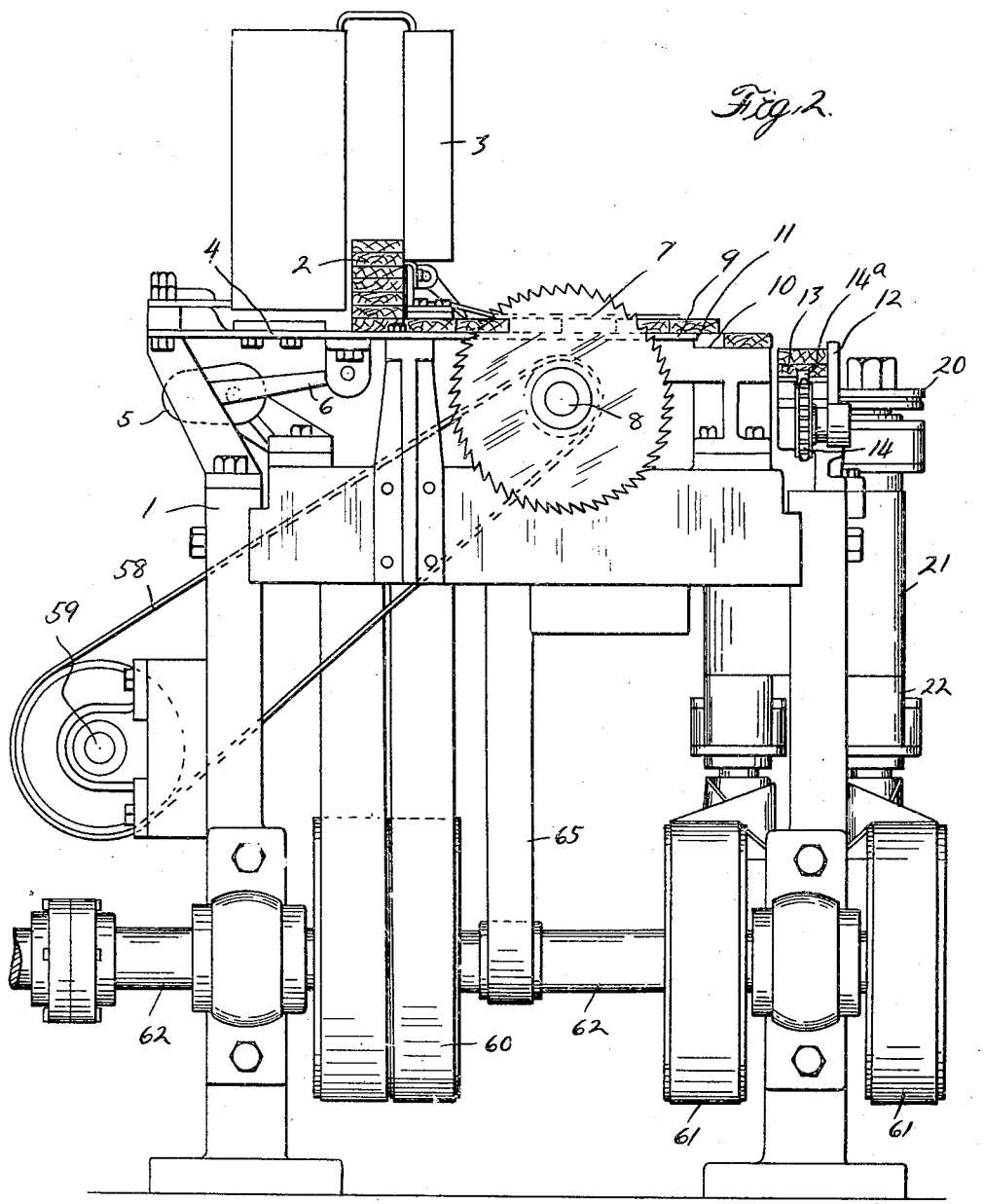
Figure 2 is an end elevation of a portion of the machine.

As shown 1 is a suitable frame for supporting the various mechanisms for successively operating upon the stock, together with the transporting means for the stock from one mechanism to another. The stock for forming the staves may be sawed from refuse lumber being cut into slats of approximately uniform width and thickness. These slats 2 are preferably engaged in a holder 3 from which they are successively fed transversely by a reciprocating feeder bar 4 operated from a crank 5 by a link or pitman 6. 7 are saws mounted upon an arbor 8 and arranged to trim the slats 2 to uniform length as they are successively advanced in transverse series over horizontal guides 9. Beyond the saws these guides are stepped downward at 10 to permit the end slat to drop below the rest of the series and to be fed by a shoulder 11 on the reciprocating feed bar into a holder 12. This holder 12 may contain several of the slats in vertical series, the lowermost slat resting upon a longitudinally slotted guide 13. 14 is a feed chain having secured thereto lugs 14a which project upward through the slotted guide 13 to engage the end of the lowermost slat and to feed said slat forward in the longitudinal direction thereof. Arranged slightly in advance of the slat in its position of first engagement with the lugs 14a is a fashioning cutter 15 which shapes the upper face of the slat to a convex or arcuate form having a radius corresponding to that of the completed barrel. The slat is guided while first engaging the cutter 15 by a roller disc 16 pressing against the upper surface thereof. It is then guided by means which will hold it to a rectilinear course and preferably of the following construction:

17 is a groove cutter shown as mounted on the same arbor as the cutter 15 and centrally of said cutter. This grooving cutter will form in the centre of the upper convex surface of the slat a guide groove 18 adapted to engage a longitudinally extending guide bar 19 mounted on the frame. Thus, after the engagement of said groove 18 with the guide 19, the slat will be held from lateral displacement or change in direction during its longitudinal movement.

To convert the slat into a stave it is necessary to fashion the opposite side edges thereof so as to impart a double taper longitudinally thereof and also to form said edges for interlocking engagement with adjacent staves. The fashioning of the staves is accomplished by edge cutters 20 which are mounted upon arbors 21 arranged on opposite sides of the stave and journaled in swingable frames 22. The swinging movement of said frames is controlled by cams 23 which bear against lugs 24 projecting from said frames to cause a positive rocking movement of the arbors 21 and cutters 20 toward each other. This movement is yieldingly resisted by a spring 25 for pressing said frames away from each other and is further resisted by a reaction of the cutter upon the edges of the work. Thus the cutters 20 will operate upon the stock during its longitudinal advancement and by suitably fashioning and timing the cams 23 any desired longitudinal contour may be imparted to the stave. This contour is such as to produce the desired bilge in the barrel while the transverse contour is such as to form the desired interlocking engagement. Preferably the transverse contour is such as to form a tongue and groove engagement between adjacent staves and also to take into account the curvature of each stave so that they will tightly fit with each other when assembled into the cylinder of the barrel.

During the operation of the cutters 20 upon the stock the latter is held to its rectilinear course by the guide 19 as previously described and as this guide is straight as is also the groove 18 the staves will be perfectly symmetrical. While still in engagement with the guide 19 at a point beyond the point of disengagement of the lug 14a from the stave, there is arranged a bottom planing cutter 26. This preferably forms a flat smooth face on the stave during the continued forward movement thereof under the actuation of a following stave engaged by another lug 14a on the feed chain 14. The stave is then disengaged from the guide 19 and drops into a holder 27 where successive staves may be arranged in vertical series. From the holder 27 the staves are successively fed transversely to form a series. This feeding is preferably effected by a reciprocating feeder 28 having a pusher bar 29 which in each reciprocation engages the lowermost stave of the series in the holder 27 and advances it over guides 30 transversely a distance greater than the width of the stave. The feeder 28 is further provided with a series of pawls 31, 32 and 33 which successively engage with the advanced staves and further advance them in open series to a point where the crozing and stapling operations are to be performed. By this construction each stave will be exactly positioned in relation to the crozing and stapling mechanism which is essential to the proper operation thereof.

*Crozing mechanism*

The crozing cutters 34 are mounted upon an arbor 35 which is journaled in bearings in a swinging frame 36. The pivotal centre 37 of this frame is so located that the radius of the arc through which the cutter 34 swings is exactly equal to the radius of the barrel head and thus the path of the cutter through the stave will form an arc of this radius. It is necessary, however, that the stave should be firmly held during the crozing operation which may be accomplished by clamps 38 actuated by cams 39 on a shaft 40 and operating to firmly clamp the stave on the guides 30. The mechanism is so timed that after each stave is fed to the position for operation upon by the crozing cutter, the clamp 38 is tightened and remains in engagement with the stave until the completion of movement of the crozing cutter. The clamp is then released and the crozed stave is displaced by a successive stave after which the operation is repeated.

Stapling mechanism

For the purpose of hingedly connecting the staves to form the knock down barrel sections, adjacent staves are connected to each other by pairs of staples which are arranged on opposite sides of the longitudinal centre thereof. Any suitable construction of stapling mechanism may be used but specifically shown, it is of the following construction:

41 is an anvil over which the staple is formed and which is located so as to bridge the joint between adjacent staves. 42 is a reciprocating head for bending the wire of the staple over the anvil 41, and 43 is a driving head which engages the staple after the lateral withdrawal of the anvil and drives the two prongs thereof respectively into the adjacent staves. The wire for forming the staple is advanced into engagement with the anvil and head 42 by an oscillatory rock arm 44 having feed pawls 45 thereon. This rock arm 44 in turn is actuated by a reciprocating rod 46 actuated by an eccentric 47 on a shaft 40 which is timed to make a revolution for each advancement of stave by the feeder 28. The engagement between the reciprocating rod 46 and the oscillatory arm 44 is through the medium of a hooked pawl 49 pivotally attached to the rod 46 and engaging a pin 50 on the rock shaft 51 to which the arm 44 is secured. The pivotal pawl 49 has a counter-weight 52 which normally holds it in engagement with the pin 50 but after a predetermined number of reciprocations corresponding to the number of staves in one barrel section, said pawl is disengaged to omit the formation of a staple. The disengagement is effected by a cam 53 on a rotary member 54 which is actuated step by step through a hooked pawl 55 also carried by the reciprocating member 46. The pawl 55 engages a ratchet wheel 56 on the rotary member 54 and the number of teeth in this ratchet wheel corresponds to the number of staves in the section. Thus, once in each complete revolution of the member 54 the cam 53 is so positioned as to engage with the lug 57 on the pawl 49 disengaging said pawl from the pin 50 and permitting one reciprocation of the rod 46 without the corresponding oscillation of the member 44. However, the operation of the pawl 55 occurs as usual and removes the cam 53 so that in the succeeding reciprocation of the rod 46 the pawl 49 will reengage with the pin 50 and again feed the wire for the staple. The staple forming mechanism just described is duplicated for the simultaneous forming of the two staples which are engaged with each pair of staves, the functioning of said mechanisms being identical. Any suitable driving and timing mechanism may be employed for operating the mechanisms previously described but as shown, the construction is as follows:

The cutters 7 are driven by a belt 58 from a shaft 59. The cutters 15 and 20 are driven respectively by belts 60 and 61 from a shaft 62 and the cutters 34 are driven by a belt 63 from a shaft 64. No connecting mechanism is shown between the shafts 59, 62, and 64 but it is obvious that all may be driven from a common source of power. The shaft 62 also drives a belt 65 which actuates a pulley 66 and therefrom a step down gearing 67 and 68 on a shaft 69. This shaft extends transversely of the frame and actuates a sprocket 70 for driving the feed chain 14. The shaft 69 also has mounted thereon a beveled gear wheel 71 for actuating the beveled gear wheel 72 on a shaft 73 which through the medium of spur gears 74, 75 actuates the longitudinally extending shaft 76. This shaft has at its forward end a sprocket and chain connection 77 with a crank shaft 78 which operates the crank 5 and rod 6 of the feed mechanism. At the opposite end of the shaft 76 is a crank 79 which actuates a rod 80 for operating the feed mechanism 28. The shaft 76 also is connected by the sprocket and chain connection 81 to a crank shaft 82, the crank 83 of which is connected by a rod 84 with the swinging frame 36 of the croze cutter. The shaft 76 further actuates through the medium of a sprocket and chain connection 85 a spur gear 86 which intermeshes with the gears 87 and 88 for actuating the cams 23.

Operation

In operation the stock or slats 2 from which the staves are to be formed and which are approximately of uniform width and thickness are placed in the holder 3 from which in the successive reciprocations of the feeder bar 4 they will be advanced in transverse series. As these slats pass the saws 7 they are trimmed to the proper length and in their further progress successively drop down the step 10 and are then pushed by the shoulder 11 on the feed bar 4 into the holder 12. This dropping of the slat on the step 10 compensates for any variation in the width of the slats which in the whole series might be sufficient to throw them out of registration with the holder 12. However, the slat on the step 10 is independently fed by the shoulder 11 and therefore is placed in exact registration with the holder 12.

The slats in the holder 12 will be successively fed longitudinally by the lug 14a on the feed chain 14 and as each slat is advanced it goes first into engagement with the roller disc 16, the V-shaped or sharpened edge of which holds the slat from lateral displacement. This roller is preferably mounted on a rock frame 16a and is pressed downward by the tension of the spring 16b. After passing the roller 16 the forward end of the slat passes under a presser bearing 89 which is under the tension of a spring 90 and which holds the slat against the bed or table while it is operated upon by the cutters 15 and 17. As previously described the cutters 15 shape the upper face of the stave and the cutter 17 forms a central groove therein for engagement with the guide 19.

After leaving the cutters 15 and 17 the slat goes into engagement with the guide 19 which will hold it to a rectilinear course while it is operated upon by the side fashioning cutters 20. These are so shaped as to form on one edge of the slat a tongue and on the other edge a groove while the outward and inward movement of the cutters controlled by the cams 23 will impart to the slat the desired longitudinal contour. This will be exactly predetermined inasmuch as the feed chain 14 and cams 23 operate in timed relation to each other.

As the machine is designed to use low grade stock frequently cross grained, there is danger of splitting when operated upon by the cutters. This is particularly true at the end of the side shaping cut where the splitting off of an end may render the stave useless. This difficulty I have overcome by reversing the usual practice and rotating the shaping cutters 20 in the direction of feed instead of counter to such direction. It is, however, necessary to also retard the advance of the blank preferably by friction retarding means. Thus, as shown in Figure 15, the cutting edges of each rotary cutter enter upon their cut in a direction transverse to the grain of the wood so as to have no tendency to split off the end portion of the stave. After passing out of engagement with the cutters 20 the staves are advanced to the planing cutter 26 which smooths the lower or inner face thereof. This cutter is located beyond the sprocket 70 which drives the chain 14 thereby avoiding interference with such chain and the feeding of the stave after passing out of engagement with the lug 14a is effected by the pressure of the following stave. Thus, the stave will be advanced beyond the cutter 26 until it drops into the holder 27.

In feeding the staves from the holder 27 it is very important that they should be properly aligned to avoid the projection of one stave beyond another. This is accomplished by a mechanism cooperating with the feeder 28 and comprising a yieldable stop bar 91 against which the end of the stave strikes on entering the holder 27. This bar 91 is connected by a rod 92 with a bell crank lever 93 which is actuated by a pin or lug 94 on the pusher bar 29. As the latter approaches its rear position this will cause a movement of the member 91 against the end of the stave forcing the latter backward until its opposite end engages a transversely extending guide 95' (see Fig. 1a). A spring 96 forms a yielding connection for member 91 between the rod 92, said member 91 and a stop bar 95 and thus permits said member 91 to yield when the stave first comes in contact with it.

The transverse feeding of the staves to the crozing and stapling mechanism has been previously described, this comprising the pusher bar 29 and the series of pawls 31, 32, 33, etc., on the reciprocating feeder 28. The arrangement is such that when the stave reaches the point for engagement with the crozing cutter it will be exactly positioned by the pawls 33 so that the longitudinal central line of the stave is in the plane of the pivot for the swinging frame 36. While in this position the clamps 38 are depressed by the cams 39 holding the stave from displacement while it is operated upon by the crozing cutter. This cutter swings with the frame 36 and consequently cuts an arcuate groove of a radius corresponding to the radius of the barrel head.

The stapling is performed as previously described and the mechanism is so located that the driven staples embrace the joint between a pair of adjacent slats and at equal distances from the longitudinal centre thereof. The stapling is preferably formed with its cross bar sufficiently curved to permit the bending of the attached staves into the circle of the barrel. After the required number of staves has been connected by staples to form a section the operation of the stapling mechanism is suspended for one cycle due to the action of the cam 53 operated by the ratchet wheel 56. This wheel has a number of teeth corresponding to the number of staves in a section and consequently once in each revolution of said wheel the cam 53 will be positioned so as to disengage the hooked pawl 49 from the pin 50 thereby sustaining the operation of the stapling mechanism for one cycle. The ratchet wheel 56 is held from displacement while the cam 53 is operating by means of a spring pressed latch dog 56a. While I have described an automatic machine in which all of the operations for forming the knock down barrel sections are successively performed, it is obvious that the same result could be attained by the use of separate machines.

What I claim as my invention is:

1. A machine for manufacturing barrel staves comprising means for longitudinally advancing the stave blank, means for forming in said blank during such advancement a longitudinally extending rectilinear groove, a guide for engaging said groove during further advancement of said blank to hold the same in a rectilinear path, edge cutters for fashioning the opposite edges of said blank, and means for shifting said cutters with reference to the longitudinal axis of said blank timed with said advancing means.

2. A machine for manufacturing barrel staves comprising means for longitudinally advancing the stave blank, means for forming in said blank during said advancement a longitudinally extending rectilinear groove, a guide for engaging said groove during further advancement of said blank to hold the same in a rectilinear path, edge cutters for fashioning the opposite edges of said blank and means for actuating said edge cutters oppositely and equally with reference to the central longitudinal axis of said blank timed with said advancing means to impart an exactly predetermined symmetrical form to the stave.

3. A machine for manufacturing barrel staves comprising means for longitudinally advancing the stave blank, means for forming in said blank during such advancement a longitudinally extending rectilinear groove, a guide for engaging said groove during further advancement of said blank to hold the same in a rectilinear path, edge cutters for fashioning the opposite edges of said blank and means for actuating said edge cutters towards and from the central longitudinal axis of said blank timed with said advancing means to impart an exactly predetermined symmetrical form to the stave.

In testimony whereof I affix my signature.

WILLIAM G. LATIMER.